United States Patent [19]

Anderson

[11] Patent Number: 5,751,512

[45] Date of Patent: May 12, 1998

[54] DATA STORAGE FORMAT FOR DATA STORAGE DEVICES HAVING A RADIAL OFFSET BETWEEN READ AND WRITE ELEMENTS

[75] Inventor: David Bruce Anderson, Minnetonka, Minn.

[73] Assignee: Seagate Technology, Inc., Scotts Valley, Calif.

[21] Appl. No.: 730,564

[22] Filed: Oct. 15, 1996

Related U.S. Application Data

[63] Continuation of Ser. No. 188,565, Jan. 28, 1994, abandoned.

[51] Int. Cl.$^6$ .................................................. G11B 5/02
[52] U.S. Cl. ...................... 360/78.04; 360/48; 360/78.14
[58] Field of Search ............................ 360/78.04, 48, 360/113, 77.02, 77.05, 78.08, 78.14, 46, 77.08; 369/44.26, 47, 48, 111, 275.3, 275.4; 156/655; 395/425

[56] References Cited

U.S. PATENT DOCUMENTS

| | | | |
|---|---|---|---|
| 4,656,532 | 4/1987 | Greenberg et al. | 360/48 |
| 4,979,056 | 12/1990 | Spuires et al. | 360/69 |
| 5,253,131 | 10/1993 | Chevalier | 360/78.14 |
| 5,257,149 | 10/1993 | Meyer | 360/78.14 |
| 5,326,429 | 7/1994 | Cohen et al. | 156/655 |
| 5,337,198 | 8/1994 | Nishiyama et al. | 360/65 |

FOREIGN PATENT DOCUMENTS

| | | |
|---|---|---|
| 0 611 208 A2 | 9/1994 | European Pat. Off. |
| 0 611 208 A3 | 9/1994 | European Pat. Off. |
| 2 279 491 | 4/1995 | United Kingdom |

OTHER PUBLICATIONS

Hitoshi et al., *Patent Abstracts of Japan*, vol. 18, No. 618 (P-1831), Nov. 24, 1994; JP6231541 (Hitachi Ltd.), Aug. 19, 1994.

Research Disclosure, *Providing Additional ID Read Capability to Allow a Single ID with Magnetoresistive (MR) Head*, No. 321, Jan. 1991, Havant GB, p. 40.

*Primary Examiner*—Aristotelis M. Psitos
*Assistant Examiner*—K. Wong
*Attorney, Agent, or Firm*—Kinney & Lange, P.A.

[57] ABSTRACT

A data format defining a data field having an embedded reading-address subfield and an offset writing-address header allows a transducer having separate read and write elements separated by a gap to perform read and write operations. When reading from the disc, the read element is positioned adjacent the data fields stored on a track. As the data fields pass the read element, the data field addresses stored in the embedded reading-address subfields are compared to a target address. If a match is found, the user data contained in a user data subfield of the matched data field is provided to a controller. When writing to the disc, the read element is positioned adjacent the writing-address headers. The addresses stored in the writing address headers are read and compared to the target address. If a match is found, the user data provided by the controller is written to the user data subfield of the data field associated with the matched writing-address header, and the address of the data field is rewritten to the embedded reading-address subfield of the data field. The data field is offset from the writing-address headers by a magnitude determined by the gap and skew angle.

13 Claims, 7 Drawing Sheets

DATA STORAGE FORMAT FOR DATA STORAGE DEVICES HAVING A RADIAL OFFSET BETWEEN READ AND WRITE ELEMENTS

The is a continuation of application Ser. No. 08/188,565, filed Jan. 28, 1994, now abandoned

BACKGROUND OF THE INVENTION

The present invention relates to data storage systems. Specifically, the present invention pertains to a data organization and management format suitable for use with a disc drive system having separate read and write elements.

Disc drive systems are widely accepted in the computer industry as a cost-effective, reliable form of data storage. The advantages of disc drive technology over other means of data storage include increased data transfer rate and storage capacity. These two advantages continue to motivate the growth and evolution of disc drive technology.

At the heart of a disc drive storage system is a storage disc that rotates at high speed while read/write transducers "fly" over the disc surface. As the disc rotates, a transducer-supporting carriage, called a slider, lifts the read/write transducer assembly so that it glides on an ultra-thin cushion of air over the rotating surface of the disc. The storage disc is generally organized to store data on a set of concentric, circular tracks. Each track is partitioned into a number of data fields. Data are written to and read from the disc by specifically accessing a particular data field, which causes an actuator to move the read/write transducer assembly adjacent the data track containing the addressed data field. Thereafter, the addressed data field will pass under the read/write transducer.

Generally, there are two kinds of actuators that may be used to position the transducer assembly adjacent the disc surface. The first kind is the linear actuator. A linear actuator moves the slider across the surface of the disc in a radial direction transverse to the concentric, circular data tracks. Linear actuators are advantageous because they keep the read/write transducer at a constant angle with respect to the stored data, thereby maintaining a strong signal-to-noise ratio. They are, however, relatively large and slow compared to rotary actuators, the second kind of actuator. The rotary actuator moves the transducer along an arc, traversing the concentric, circular data tracks of a disc. The arc extends from the disc's smallest track, near the center of the disc, to its largest, near the outer edge. The intersection of the actuator arc and a concentric data tracks of the storage disc forms a skew angle between the read/write transducer and the data track. The skew angle, which varies with the radius of an addressed data track, can weaken the signal strength as perceived by the read/write transducer.

Recent changes in disc drive technology have made it advantageous to use separate elements for reading and writing. Using two elements allows one element to be designed to perform as an optimum reader and the other as an optimum writer, avoiding the tradeoffs associated with implementing both functions in a single element. A performance synergy can result if the two are designed to complement each other. For example, a writer may be designed to write a relatively wide path and the reader designed to have a narrower read width. Together, they yield a greater storage density for a given level of tracking precision by permitting the reader to practically weave across a data track without sacrificing signal strength. Unfortunately, using separate read and write elements introduces a positioning problem because the two elements are separated by an appreciable gap. The gap and the skew angle make it impossible to position both elements in-line over all tracks.

The performance of a two-element transducer can be optimized for a particular data track on a storage disc. Achieving optimal performance requires aligning the write element with the data track when writing information and aligning the read element with the data track when reading information. When a linear actuator is used, alignment is relatively simple because the elements can be positioned in-line, and will remain in-line at all data tracks. However, a rotary actuator introduces a skew angle which changes with every data track. Even if the elements are in-line over a particular track, the skew angle introduces an offset when the elements were moved to another track.

Typically, a data track for a disc drive with a single combined read/write element is formatted as a single line of data fields interleaved with corresponding address headers. Schematically, the headers (Hs) and data fields (Ds) are arranged in a line (i.e. H—D—H—D—H—D— ... H—D) around each circular track of the disc. The arrangement, referred to as a single-header format, is such that a one-to-one correspondence exists between the headers and data fields. Headers are essentially track road signs, signaling that a particular data field is straight ahead. The drive controller uses these headers to check transducer position and disc integrity before writing data to or reading data from a data field. Therefore, the header must be read before the data field is accessed.

During write operations, this format presents a problem for disc drives having separate read and write elements. The read element must be positioned over the headers to read the header address, but the write element must be positioned over the data fields to write the data. In addition, it is impractical in a high performance disc drive system to reposition the write element immediately after the read element reads the header.

This problem was addressed in U.S. Pat. No. 5,257,149 to Forrest C. Meyer and entitled "Disc Drive With Offset Address Field", which is assigned to the same assignee as the present application. The Meyer patent discloses a format that links two address headers with every data field. The first header is in-line with its corresponding data field. The second header is radially offset based on track position. The in-line header is used during read operations to identify the data field and the offset header is used during write operations to identify the data field. The simultaneous alignment during write operations of the write element adjacent the data field and the read element adjacent the offset header avoids the misalignment present when using a single in-line header. However, the dual-header format requires more disc space as overhead than does the single-header format. Headers are not used to store user data, and therefore detract from the amount of storage available to the user.

SUMMARY OF THE INVENTION

The present invention is a data storage format and method of accessing discs suitable for disc drives employing separate read and write elements. Under the present invention, a disc drive system includes a storage disc having a plurality of data-carrying tracks, a slider, a transducer carried by the slider, and a radial actuator for positioning the slider adjacent the data-carrying tracks. The transducer is provided with a write element for writing data to the storage disc and a read element for reading data from the storage disc. The read and write elements are separated by a gap.

The radial actuator moves the slider along an arcuate path that establishes a skew angle between the write and read elements based on a radial position of the data-carrying track. Accordingly, an offset exists between the read and write elements at each data-carrying track based on the skew angle and the gap.

Stored on the storage disc are a plurality of data fields distributed among the data-carrying tracks. Each data field has an address and is comprised of a user-data subfield for storing user data and an embedded reading-address subfield for identifying the address of the respective data field during a read operation. Also stored on the storage disc are a plurality of writing-address headers distributed among the data-carrying tracks of the storage disc, with each writing-address header corresponding to a data field and identifying the address of the corresponding data field during a write operation. Each writing-address header is radially offset from the corresponding data field by the offset of the data-carrying track at which the corresponding data field is located.

In one form of the invention, user data is written to a target address of the storage disc by positioning the read element adjacent the writing-address headers located on the target track. After an address read from a writing-address header is matched to the target address, the user data is written to the user-data subfield of the data field associated with the writing-address header. In addition, the target address is rewritten to the embedded reading-address subfield of the data field. Since the data field is radially offset from the writing-address header by the proper offset magnitude, the read transducer is aligned adjacent the writing-address headers of the target track while the write transducer is simultaneously aligned adjacent the data fields of the target track.

In another form of the invention, user data is read from a target address of the storage disc by positioning the read element adjacent the data fields located on the target track. After an address read from an embedded reading-address subfield is matched to the target address, the user data read from the corresponding user-data subfield of the data field is provided to the data storage system's controller.

In another form of the invention, a track is formatted by positioning the write element adjacent the track to be formatted. A plurality of writing-address headers are then written to the track, with each writing-address heading storing an address of a data field to be associated with the writing-address header. The read element is then positioned adjacent the writing-address headers which were just written, and the data fields are written to the track, including the reading-address subfield, which stores the address of the data field. Since the gap and skew angle determine the offset at the formatted track, the writing-address headers will automatically be offset from the data fields by the proper offset magnitude. During normal operation, the write element need never be positioned adjacent the writing-address headers.

DETAILED DESCRIPTION OF THE PREFERRED EMBODIMENTS

Figure 1:
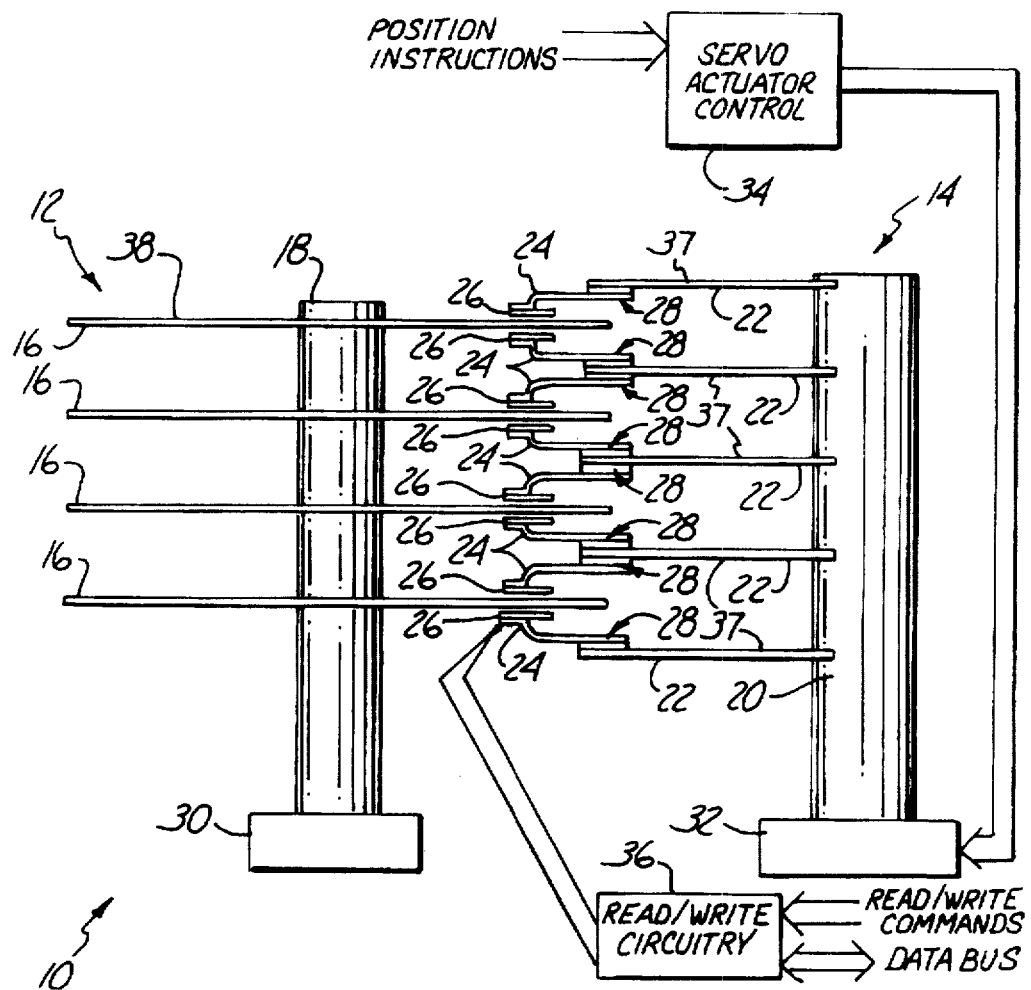
FIG. 1 shows a magnetic disc storage system.

FIG. 1 shows a disc drive 10 which includes a disc pack 12 and an E-block assembly 14. Disc pack 12 carries discs 16, which are stacked on a drive spindle 18. E-block assembly 14 includes a servo spindle 20 and a plurality of rotary arms 37 that are mounted to spindle 20. Each rotary arm 37 comprises a support arm 22 which carries one or two flexure arms 24. Each flexure arm 24 includes a transducer assembly 26. Each flexure arm 24 is connected to a corresponding support arm 22 by a mount 28. A spindle motor 30 is connected to drive spindle 18. An actuator 32 is coupled to servo spindle 20. A servo actuator control 34 receives positioning instructions and is connected to actuator 32. Each transducer assembly 26 carries read and write elements (not shown in this Figure) and is connected to read/write circuitry 36. Read/write circuitry 36 is connected to a data bus for carrying information during read and write operations.

In operation, motor 30 rotates drive spindle 18, which causes discs 16 to rotate in unison. Actuator 32 moves servo spindle 20 so that transducer assemblies 26 move between data tracks on each disc 16. Read/write circuitry 36 converts a raw data signal from the read element of transducer 26 into digital data pulses. Servo actuator controller 34 receives position instructions and controls actuator 32 based upon these position instructions. Read/write circuitry 36 receives information from a data bus and writes it onto a surface of a disc 16 using the write element of a transducer assembly 26. Read/write circuitry 36 is also used for reading information from the surface of disc 16 and providing the information to the data bus.

Figure 2:
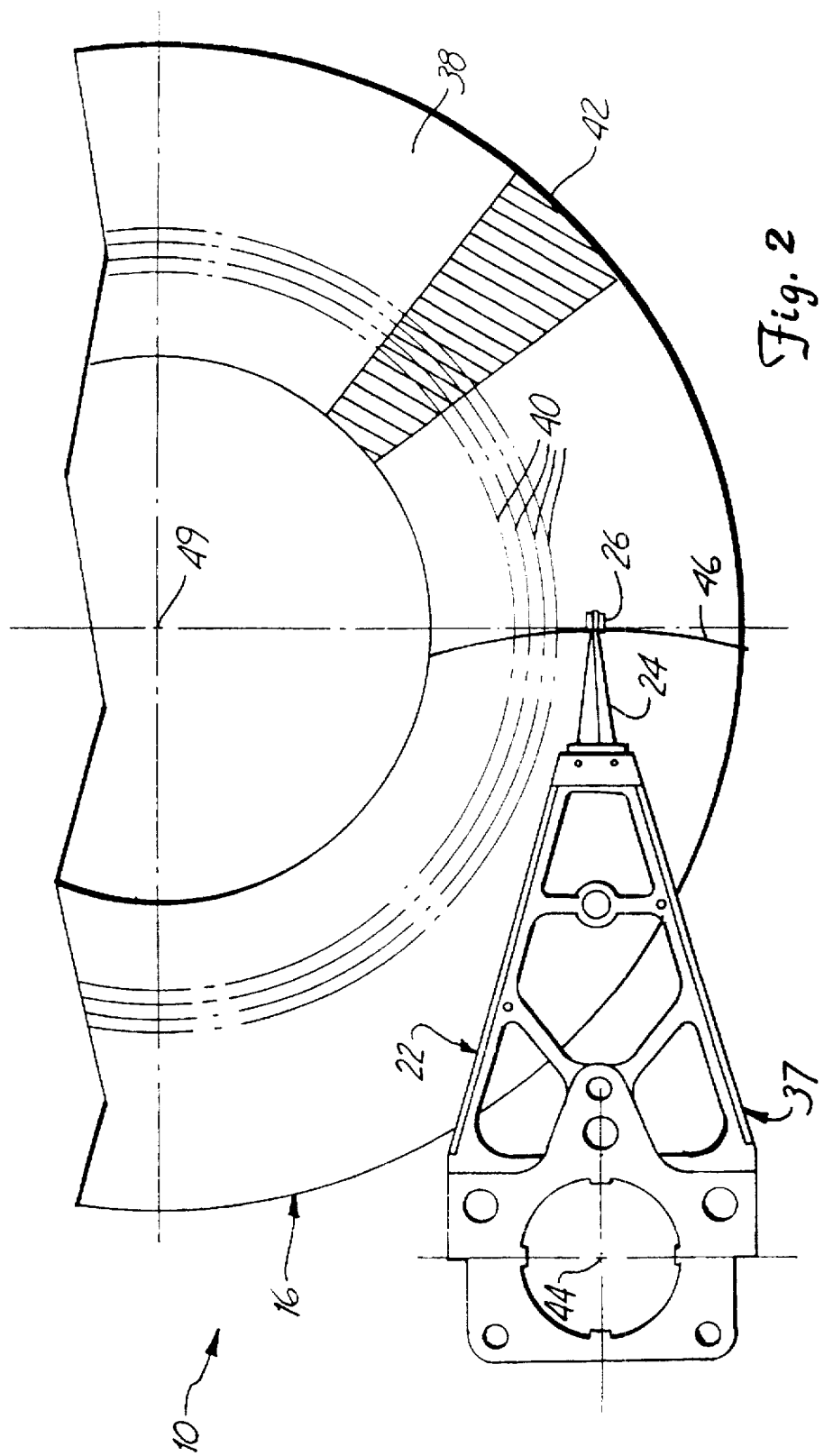
FIG. 2 is a top plan view of a support arm and a magnetic disc.

FIG. 2 is a top-plan view of magnetic storage system 10. Magnetic storage disc 16 rotates about an axis of rotation 49. A rotary arm 37 is shown positioned adjacent a surface 38 of magnetic storage disc 16. Surface 38 is divided into data tracks 40 and data fields 42.

Rotary arm 37 rotates about an axis of rotation 44. By rotating rotary arm 37 about axis of rotation 44, transducer 26 moves along arc 46, thereby moving transducer 26 between tracks 40 of storage disc 16.

Figure 3:
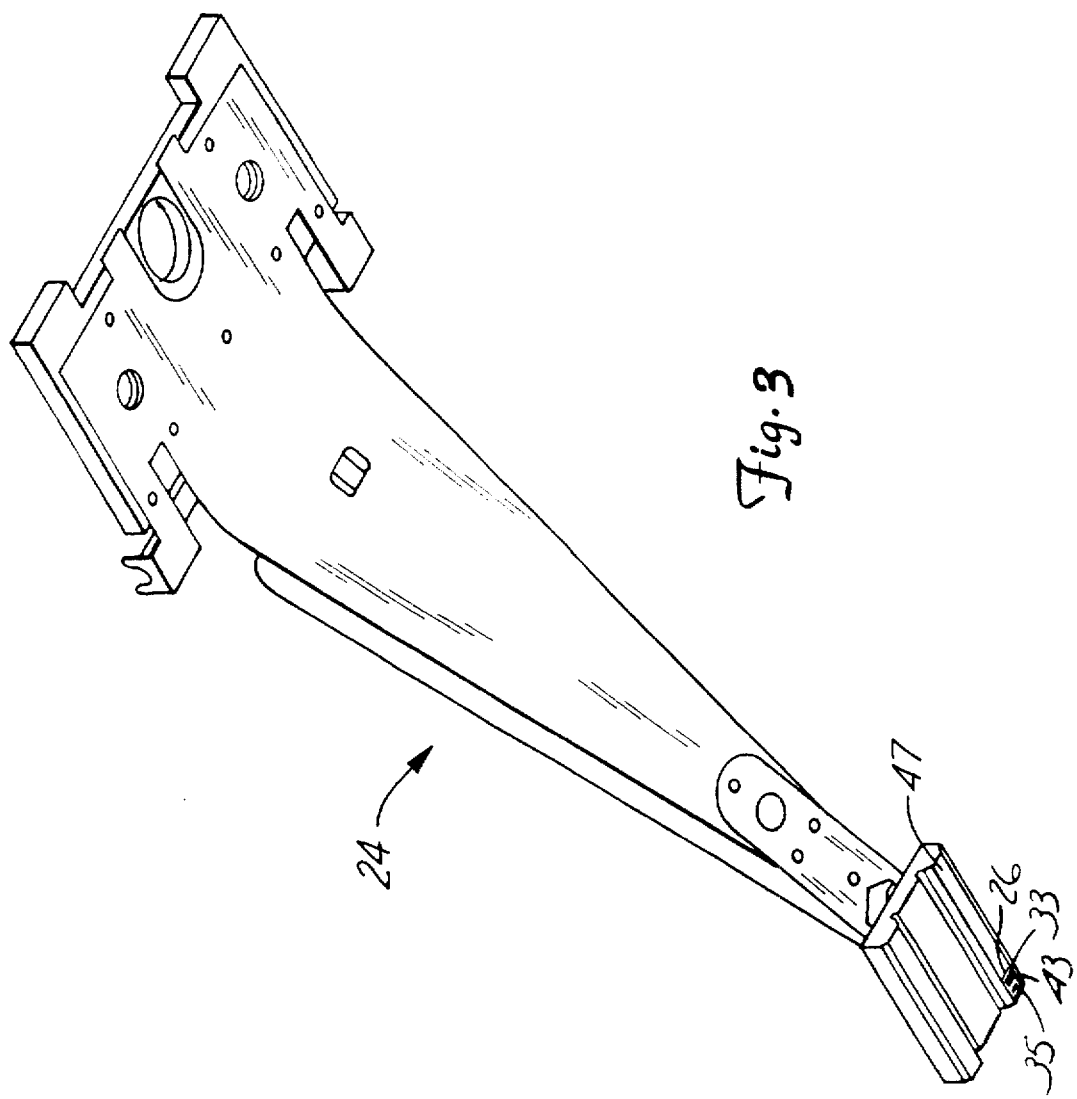
FIG. 3 is a perspective view of a flexure arm and a slider carrying separate read and write elements.

FIG. 3 is a perspective view of flexure arm 24. Flexure arm 24 includes slider 47. Slider 47 has aerodynamic properties which cause slider 47 to fly over the surface of rotating storage disc 16. Flexure arm 24 is spring loaded and opposes lift from slider 47.

Transducer assembly 26 is carried by slider 47. Assembly 26 includes write element 35 and read element 33. Element 35 is separated from element 33 by gap 43.

Figure 4:
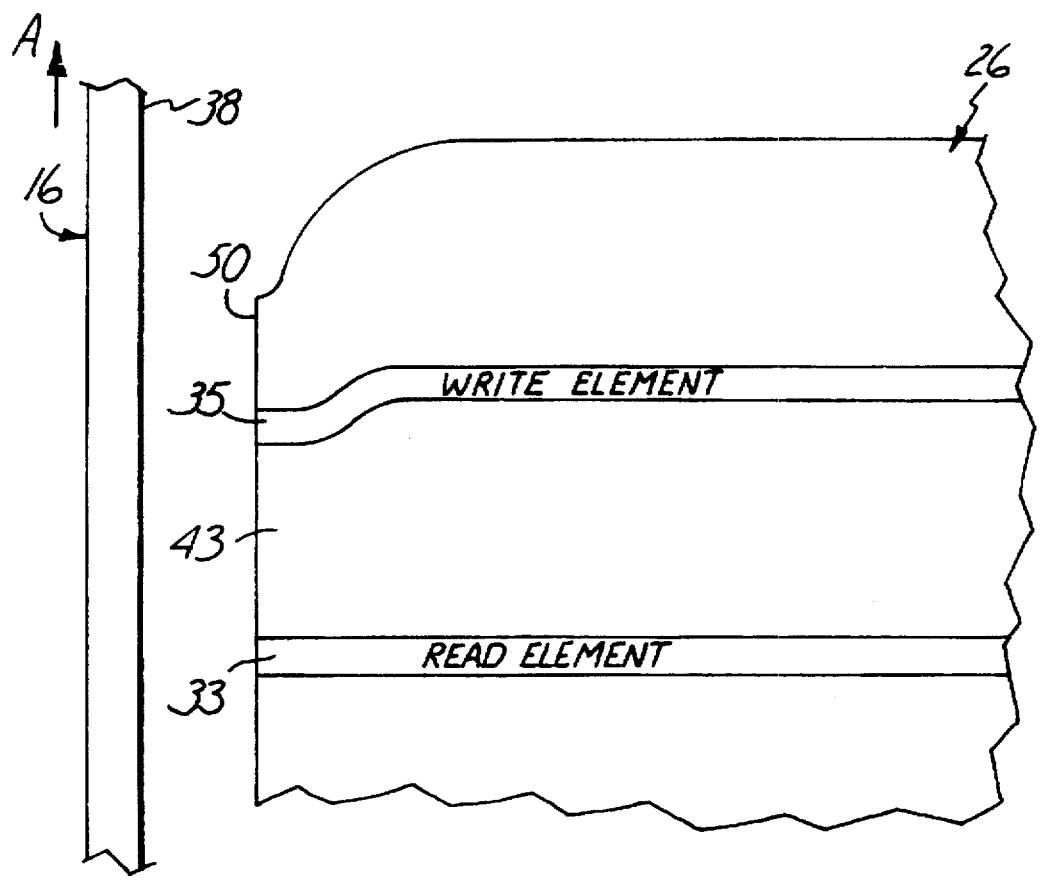
FIG. 4 is a sectional view of a transducer having separate read and write elements and positioned proximate a disc surface.

FIG. 4 is a sectional view of two-element transducer 26 adjacent disc 16. In this embodiment, write element 35 is a thin-film transducer and read element 33 is a magnetoresistive sensor. Although FIG. 4 shows a specific embodiment of transducer 26, with write element 35 and read element 33 separated by gap 43, it is contemplated that the present invention can be used in any storage device wherein a gap exists between a read element and a write element. Transducer 26 is carried by slider 47 (shown in FIG. 3) and has an air-bearing surface 50 which meets exacting tolerances.

Air-bearing surface 50 faces surface 38 of magnetic storage disc 16. A spacing between air-bearing surface 50 and disc surface 38 is preferably minimized while avoiding contact between transducer 26 and magnetic disc 16. Write element 35 and read element 33 each comprise a portion of air-bearing surface 50.

Figure 5:
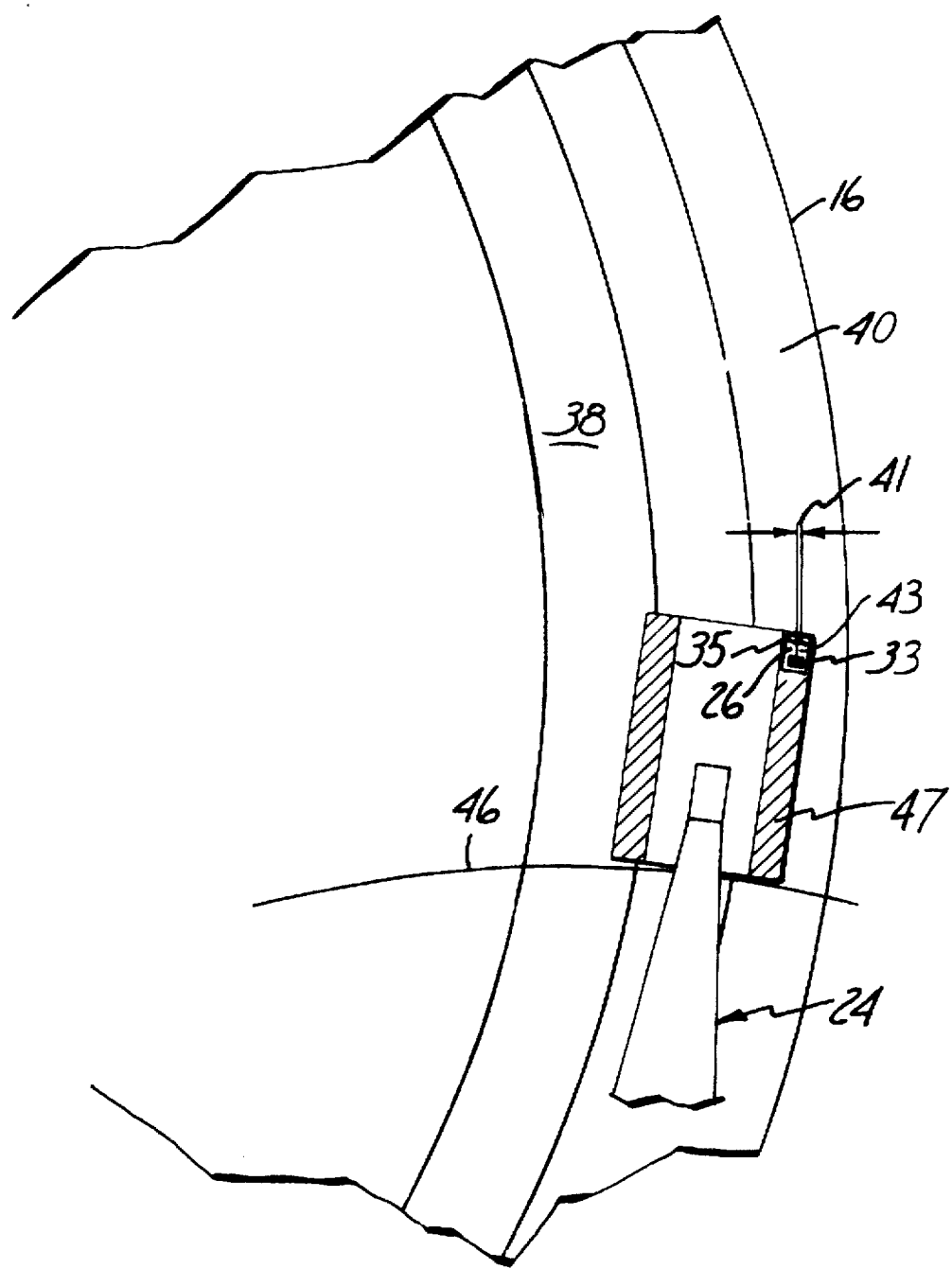
FIG. 5 is a top plan view of a transducer having separate read and write elements positioned adjacent a data track of a disc.

FIG. 5 is a top plan view showing the arm 24 of FIG. 2 positioned to read data from and write data to one of the outermost tracks 40 of disc 16. In this position, slider 47 is positioned at a substantial skew angle along arc 46 and write element 35 is not in-line with read element 33 with respect to track 40. Accordingly, a radial offset 41 exists between the read element and the write element at this track. Further, offset 41 will vary with the radial position of arm 24. The present invention provides a format which compensates for the offset 41, while maintaining a relatively high format efficiency.

Figure 6:
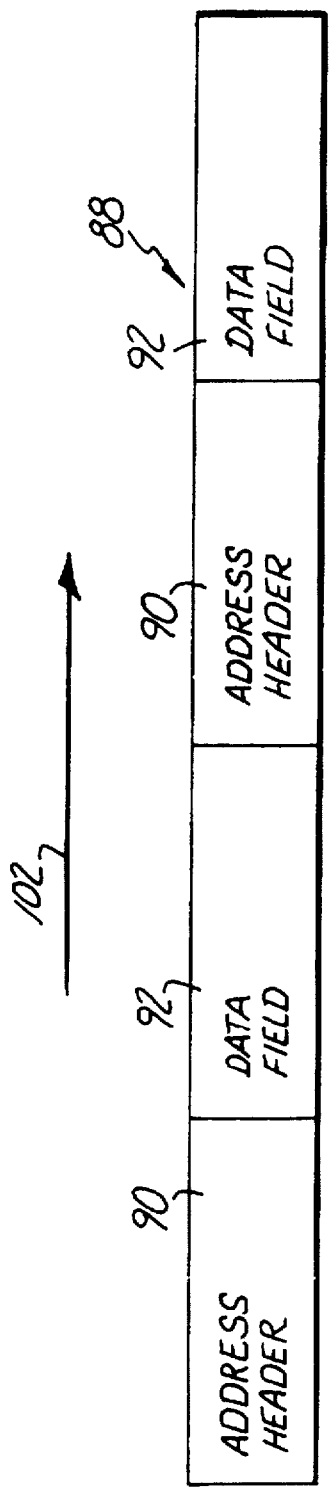
FIG. 6 is a diagram of a standard prior art format for a data track in a magnetic disc storage system.

FIG. 6 is a physical schematic diagram of a prior art data track 88. Although data track 88 is in reality an arc, it is illustrated for simplicity as a straight path. Data track 88 includes address headers 90 and data fields 92. Two-element transducer 26 travels along data track 88 in a direction indicated by arrow 102. If two-element transducer 26 travels along prior art data track 88 at a skew angle, it is impossible for both read element 33 and write element 35 to be aligned simultaneously with data track 88.

Prior to writing information in data field 92, address header 90 must be read. Address header 90 contains position information and information about the integrity of the succeeding data field 92. Therefore, during a write operation two-element transducer 26 must be realigned after reading address header 90 and prior to writing data field 92. This realignment is not practical in a high-performance disc drive system.

Figure 7:
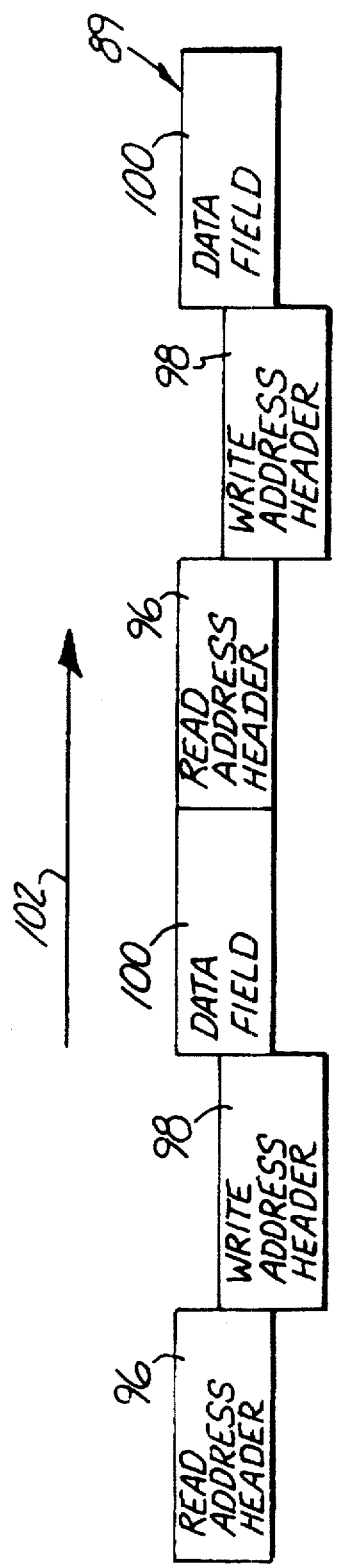
FIG. 7 is a diagram of a prior art format of a data track intended for use with a two-element magnetic disc storage system.

FIG. 7 is a physical schematic diagram of a data track 89 formatted in accordance with U.S. Pat. No. 5,257,149 to Forrest C. Meyer and entitled "Disc Drive with Offset Address Field", which is assigned to the same assignee as the present application. Although data track 89 is in reality an arc, it is illustrated for simplicity as a straight path. Data track 89 includes read address headers 96, write address headers 98 and data fields 100. Two-element transducer 26 travels along data track 89 in a direction shown by arrow 102.

During a read operation, read element 33 of two-element transducer 26 is positioned adjacent data field 100 and read address header 96. Accordingly, write address header 98 is not used and read element 33 reads address header 96 followed by data field 100. However during a write operation, two-element transducer 26 must be offset from data track 89 so that read element 33 is positioned adjacent write address header 98. Which also aligns write element 33 with data field 100. Therefore, following the reading of read address header 98, data field 100 can be written without any additional offset of two-element transducer 26. The magnitude of the offset between write address header 98 and read address header 96 varies with the track position. More precisely, the magnitude of the offset is a function of skew angle, the magnitude of gap 43, and transducer variations.

Although the format disclosed by Meyer allows a two-element transducer to be used in a disc drive system, it does so at the expense of format efficiency. Formatting efficiency is the ratio of the total available user-data storage space on a disc to the total storage capacity of the disc. The format disclosed by Meyer uses two space-consuming address headers. Each header must also store overhead information such as a preamble, a synchronization field, error correction codes, and a postamble. Accordingly, the extra header detracts from the amount of space available for user data.

Figure 8:
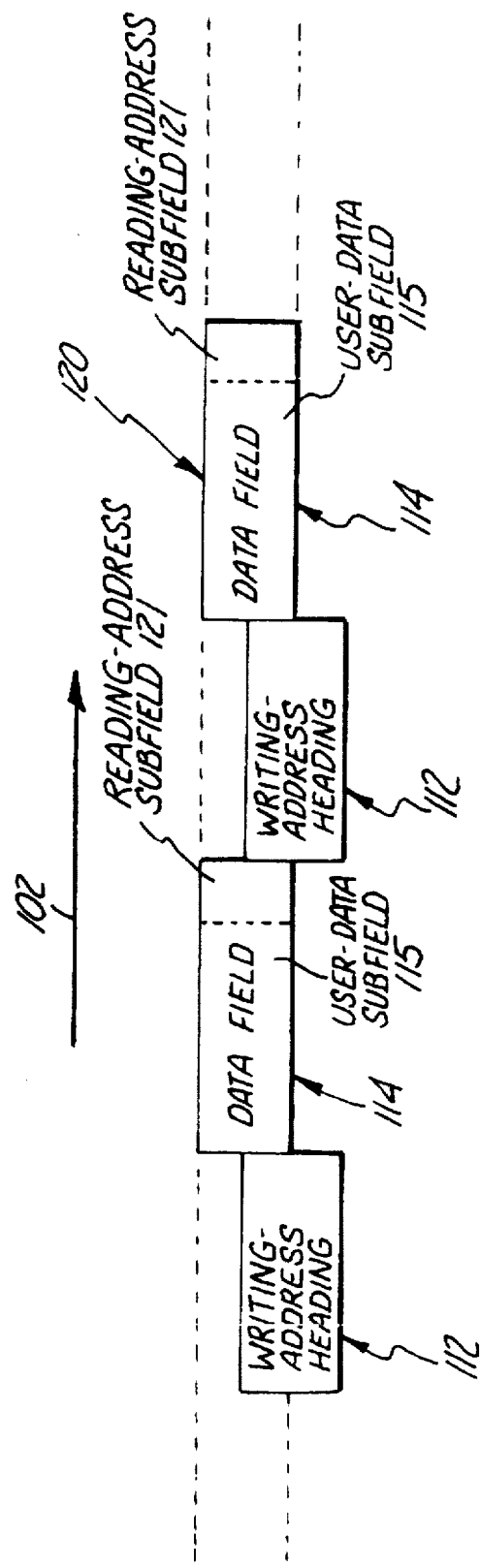
FIG. 8 is a diagram of a format of a data track of a data storage disc, in accord with the present invention.

FIG. 8 is a physical schematic diagram of data track 120 formatted according to the present invention. Although data track 120 is in reality an arc, it is illustrated for simplicity as a straight path. Data track 120 includes writing-address headers 112 and data fields 114. Data fields 114 are comprised of user-data subfields 115 and reading-address subfields 121. Two-element transducer 26 travels along data track 120 in a direction shown by arrow 102.

Executing a command to read from a target address corresponding to a data field 114 requires reading reading-address subfields 121 to determine which subfield 121 contains an address that matches the target address. Responding to the command to read from a target address, servo actuator control circuitry 34 of FIG. 1 positions transducer 26 adjacent data track 120 so that read element 33 is radially aligned with data fields 114. After reading a data field 114, the address stored in reading-address subfield 121 is compared to the target address. If reading-address subfield 121 matches the target address, user-data subfield 115, which will typically have been stored in a temporary buffer, is provided to the host computer to complete the command. However, if there is no match, data field 114 does not correspond to the target address and user-data subfield 115 will be rejected. Read element 33 then reads the next data field, and the process is repeated. During a read operation, write element 35 is not used and its alignment is not important.

Executing a command to write a data block to a target address requires that two-element transducer 26 be positioned adjacent track 120 so that read element 33 is aligned to successively read writing-address headers 112. As a result of correctly positioning read element 33, and the offsets between writing-addresses headers 112 and data fields 114, write element 35 is positioned to write data fields 114. Using read element 33, writing-address headers 112 are read to determine which corresponding data field matches the target address. Following a read of a writing-address header 112 and a match of its stored address with the target address, the data block is written to user-data subfield 115 and the target address is rewritten to reading-address subfield 121. Since a complete data field 114 must always be written, the reading-address subfield will also always be rewritten with the same address. However, the writing-address header is never overwritten during normal operations, and therefore provides an "anchor" for the data field location.

Although writing-address headers 112 are never written during normal operation, they are initially written when a disc is formatted according to the format of the present invention. When a disc is formatted according to the present invention, write element 35 of two-element transducer 26 is positioned at the radial position where writing-address headers 112 are to be written. After write element 35 is positioned, it writes the writing-address headers 112 for that track. Next, read element 33 of transducer 26 is positioned adjacent the writing-address headers 112, which were just written by write element 35. Accordingly, a radial offset will exist between write element 35 and read element 33. As discussed above, the magnitude of the offset will be based on the geometry of the two elements and the actuator position.

After read element 33 is positioned adjacent the writing-address headers 112, write element 35 successively writes data fields 114. After the track is formatted, each data field 114 will be comprised of a user-data subfield 115, which contains irrelevant data at this point, and a reading-address subfield 121, which contains a copy of the data field address contained in writing-address header 112. Once the formatting operation is complete, it should never again be necessary to align write element 35 adjacent writing-address headers 112 during normal operation.

The present invention provides a format which allows optimal use of a two-element transducer, without requiring a large amount of additional overhead. The format efficiency provided by the format of the present invention approaches the format efficiency of prior art formats used for single transducer disc drives, and greatly improves the format efficiency of prior art formats used for two-element transducers. Like the prior art format for disc drives having two-element transducers, the format of the present invention also provides for very fast access to user data.

Eliminating one of the headers used in prior art two-element formats increases the amount of space on the storage medium available for user data. Because address headers and data fields each typically contain overhead information such as a preamble, a synchronization field, error correction codes, and a postamble, space is conserved if user data and address data are stored together in a single data field and share the overhead information. The overhead information is not repeated for a second address header, resulting in an increase in user-data space.

Thus, the space-saving format of the present invention replaces the in-line header of the prior art with a data field having a user-data subfield for storing user data, an embedded reading-address subfield containing an address identifying the data field, and common overhead information shared by the user-data subfield and the embedded reading-address subfield during a read operation.

Although the present invention has been described with reference to preferred embodiments, workers skilled in the art will recognize that changes may be made in form and detail without departing from the spirit and scope of the invention.

What is claimed is:

1. A disc drive comprising:

a storage disc having a plurality of data-carrying tracks;

a slider;

a transducer carried by the slider, the transducer including a write element for writing data to the storage disc and a read element for reading data from the storage disc, wherein the read and write elements are separated by a gap;

a radial actuator for positioning the slider adjacent the data-carrying tracks along an arcuate path that establishes a skew angle between the write and read elements based on a radial position of the data-carrying track, wherein an offset exists between the read and write elements at each data-carrying track based on the skew angle and the gap;

a plurality of data fields distributed among the data-carrying tracks of the storage disc, each data field comprising common overhead information, a user-data subfield for storing user data, and an embedded reading-address subfield containing an address identifying the respective data field, the (common overhead information being shared by the user-data subfield and the embedded reading-address subfield during a read operation, the common overhead information being positioned to be read before reading the user-data subfield, and the embedded reading-address subfield being positioned to be read after reading the user-data subfield, each data field being formatted such that the reading-address subfield is rewritten each time the user-data subfield is rewritten; and a plurality of writing-address headers distributed among the data-carrying tracks of the storage disc, each writing-address header corresponding to a data field and identifying the corresponding data field during a write operation, each writing-address header being radially offset from the corresponding data field by the offset of the data-carrying track at which the corresponding data field is located.

2. The disc drive of claim 1 wherein the write element is a thin-film magnetic transducer.

3. The disc drive of claim 1 wherein the read element is a magnetoresistive sensor.

4. The disc drive of claim 1 wherein the writing-address header is angularly positioned before the data field.

5. The disc drive of claim 1 wherein the common overhead information comprises a preamble, a synchronization field, error correction codes, and a postamble.

6. The disc drive of claim 5 wherein the writing-address header includes writing overhead information.

7. The disc drive of claim 6 wherein the writing overhead information includes a preamble, a synchronization field, error correction codes, and a postamble.

8. A method of writing user data to a data field located on a data-carrying track of a storage disc of a data storage system, the storage disc rotating proximate a transducer having read and write elements separated by a gap, and the data storage system having a radial actuator for positioning the transducer adjacent the data-carrying tracks along an arcuate path that establishes a skew angle between the read and write elements based on a radial position of the data-carrying track, wherein an offset based on the skew angle and the gap exists between the read and write elements at each data-carrying track, the method comprising:

receiving a target address from a controller, the target address identifying a target track and a target data field;

receiving user data from the controller;

positioning the read element of the transducer adjacent a writing-address header located on the target track;

reading an address stored in the writing-address header;

comparing the address read from the writing-address header with the target address; and writing the data field corresponding to a writing-address header containing an address matching the target address, so that the data field is radially offset from the writing-address header by the offset of the track on which the data field is located, wherein writing the data field comprises:

writing the user data to a user-data subfield of the data field; and writing the target address to an embedded reading-address subfield of the data field after writing the user data to the user-data subfield.

9. The method of claim 8 wherein writing the data field further includes writing common overhead which is shared by the user-data subfield and the embedded reading-address subfield, the common overhead information being positioned to be read before reading the embedded reading-address subfield.

10. A method of reading user data from a data field having a user-data subfield containing user data, an embedded reading-address subfield containing an address identifying the data field, and common overhead information shared by the embedded reading-address subfield and the user-data subfield, the data field located on a data-carrying track of a storage disc of a data storage system, the storage disc rotating proximate a transducer having read and write elements separated by a gap, and the data storage system having a radial actuator for positioning the transducer adjacent the data-carrying track along an arcuate path that establishes a skew angle between the read and write elements based on a radial position of the data-carrying track, wherein an offset based on the skew angle and the gap exists between the read and write elements at the data-carrying track, the method comprising:

receiving a target address from a controller, the target address identifying a target data field and a target track;

positioning the read element adjacent the target track;

reading the common overhead information of a data field;

reading user data from the user-data subfield after reading the common overhead information;

storing user data read from the user-data subfield in a buffer;

reading the address from the embedded reading-address subfield of the data field, after reading the user-data subfield;

comparing the address of the embedded reading-address subfield to the target address; and providing the user data stored in the buffer to a controller, if the address read from the embedded reading-address subfield matches the target address.

11. A method of formatting a track on a data storage disc in a data storage system, the data storage disc rotating adjacent a transducer having read and write elements separated by a gap, and the data storage system having a radial actuator for positioning the transducer adjacent the track along an arcuate path that establishes a skew angle between the read and write elements based on a radial position of the track, wherein an offset based on the skew angle and the gap exists between the read and write elements at the track, the method comprising:

positioning the write element of the transducer adjacent the track;

writing a plurality of writing-address headers on the track, wherein each writing-address header includes an address of a data field corresponding to the writing-address header;

positioning the read element adjacent the writing-address headers; and successively reading writing-address headers and writing corresponding data fields, each writing of a corresponding data field including:

writing a user-data subfield;

writing an embedded reading-address subfield containing the address of the data field in a position to be read after reading the user-data subfield; and writing common overhead information to be shared by the user-data subfield and the embedded reading-address subfield during a read operation, the common overhead information being positioned to be read before reading the embedded reading-address subfield.

12. A readable-writable memory for use in a disc drive having a rotary actuator and separate read and write elements, comprising:

a plurality of concentric data tracks; and a plurality of data fields distributed among the plurality of concentric data tracks, each data field having a user-data subfield for storing user data, an embedded reading-address subfield containing an address identifying the data field during a read operation, and common overhead information being shared by the user-data subfield and the embedded reading-address subfield, the common overhead information being positioned to be read before reading the embedded-reading address subfield and the reading-address subfield being positioned to be read after reading contents of the user-data subfield, the memory being formatted such that the reading-address subfield is rewritten each time the user-data subfield is rewritten.

13. The memory of claim 12 further including a plurality of radially-offset writing-address address headers corresponding to the plurality of data fields, wherein each writing-address header identifies a corresponding data field during a write operation.

* * * * *

UNITED STATES PATENT AND TRADEMARK OFFICE
CERTIFICATE OF CORRECTION

PATENT NO. : 5,751,512
DATED : MAY 12, 1998
INVENTOR(S) : DAVID BRUCE ANDERSON

It is certified that error appears in the above-identified patent and that said Letters Patent is hereby corrected as shown below:

Col. 1, Line 1, delete "The", insert --This--

Col. 7, Line 65, delete "(common", insert --common--

Col. 10, Line 39, delete "writing-address address", insert --writing-address--

Signed and Sealed this

Eighth Day of June, 1999

Attest:

Q. TODD DICKINSON

*Attesting Officer*  Acting Commissioner of Patents and Trademarks